United States Patent [19]

Wright

[11] 4,089,820

[45] May 16, 1978

[54] CURABLE ETHYLENE/ALPHA-MONOOLEFIN/DIENE POLYMER-UNSATURATED RUBBERY POLYMER BLENDS

[75] Inventor: Roy F. Wright, Bartlesville, Okla.

[73] Assignee: Phillips Petroleum Company, Bartlesville, Okla.

[21] Appl. No.: 219,172

[22] Filed: Jan. 19, 1972

[51] Int. Cl.$^2$ ................................................ C08L 7/00
[52] U.S. Cl. ..................... 260/5; 260/45.9 R; 260/889; 260/892; 260/897 A
[58] Field of Search ................... 260/889, 892, 45.9 R, 260/897 A

[56] References Cited

U.S. PATENT DOCUMENTS

| | | | |
|---|---|---|---|
| 3,359,221 | 12/1967 | Schoenbeck | 260/889 |
| 3,580,867 | 5/1971 | Spenadel | 260/889 |
| 3,658,732 | 4/1972 | Ballini et al. | 260/889 |

FOREIGN PATENT DOCUMENTS

| | | | |
|---|---|---|---|
| 2,020,628 | 7/1970 | France | 260/889 |

Primary Examiner—J. Ziegler

[57] ABSTRACT

Sulfur curable ethylene/alpha-monoolefin/nonconjugated diene terpolymer-unsaturated rubbery polymer blends are prepared by hot-mixing an ethylene/alpha-monoolefin/nonconjugated diene polymer, e.g., ethylene/propylene/nonconjugated diene terpolymer rubber (EPDM), e.g., ethylene/propylene/1,4-hexadiene terpolymer, preferably containing any filler to be used, with a promoter, e.g., elemental sulfur, an aromatic dinitroso compound, e.g., p-dinitrosobenzene, a quinonoid nucleus containing compound, e.g., p-quinone dioxime, etc., at about 250°–450° F. for about 1–15 minutes, to improve its cure rate relative to that of an elastomer with which it is to be blended, i.e., its compatibility (vulcanizate properties), and then blending the thus treated material together with an unsaturated rubbery material or elastomer, e.g., styrene/butadiene elastomer to provide products useful in producing, as by vulcanization, various rubbery products, e.g., tire sidewalls, radiator hose, windshield wiper blades, shoe soles, heels, etc.

1 Claim, No Drawings

CURABLE ETHYLENE/ALPHA-MONOOLEFIN/DIENE POLYMER-UNSATURATED RUBBERY POLYMER BLENDS

This invention relates to the production of sulfur curable ethylene/alpha-monoolefin/nonconjugated diene terpolymer-unsaturated rubbery polymer blends and to the blends obtained. In one of its concepts, the invention relates to a treatment of the ethylene/alpha-monoolefin/nonconjugated diene polymer prior to blending the same with an unsaturated rubbery polymer or elastomer.

In one of its concepts, the invention provides a process for the production of a sulfur curable ethylene/alpha-monoolefin/nonconjugated diene terpolymer-unsaturated rubbery polymer blend which comprises, prior to the blending of the polymers involved, heat treating the terpolymer with a chemical promoter to render the same compatible with respect to cure rate with the unsaturated rubbery polymer with which it is to be blended. In another concept of the invention, it relates to a blend thus produced.

Ethylene/alpha-monoolefin/nonconjugated diene terpolymers are sometimes blended with general purpose unsaturated rubbery polymers, particularly highly unsaturated rubbery polymers or elastomers to improve ozone resistance. Ordinarily there is a consequent loss in vulcanizate properties. It is found that the two rubber types are not fully compatible due to differences in their cure rates or other conditions.

I have now discovered that treating the terpolymer prior to blending the same with the highly unsaturated rubbery material, as by a hot-mixing operation in which a chemical promoter is used that the consequently produced blend will have improved vulcanizate properties. For example, hot-mixing the terpolymer with a chemical promoter results in improved state of cure in the terpolymer vulcanizate.

It was found that when the terpolymer had been hot-mix treated according to the invention prior to blending to a 70/30 weight ratio blend of styrene/butadiene rubber with an ethylene/propylene/1,4-hexadiene terpolymer, the individual stress-strain values for the blend containing the hot-mixed terpolymer were more consistent and the averaged values were considerably better than for the blend containing untreated terpolymer material.

It is an object of this invention to provide a process for producing an improved sulfur curable ethylene/alpha-monoolefin/nonconjugated diene terpolymer-highly unsaturated rubbery polymer blend. Another object of the invention is to provide the improved sulfur curable blend produced by said process. A further object of the invention is to provide an ethylene/alpha-monoolefin/nonconjugated diene terpolymer which upon blending with a highly unsaturated rubbery polymer will have in the blend a cure rate more comparable to the highly unsaturated rubbery polymer than such a terpolymer has had heretofore in such blends.

As noted, the terpolymers, which according to the invention, are hot-mix treated and blended with a highly unsaturated elastomer are known in the art. ASTM designation D 1418-71 defines EPDM as "terpolymer of ethylene, propylene, and a diene with the residual unsaturated portion of the diene in the side chain".

Other aspects, concepts and objects of the invention as well as its several advantages are apparent from a study of this disclosure and the appended claims.

According to the present invention, there is provided a process for producing an improved sulfur curable ethylene/alpha-monoolefin/nonconjugated diene terpolymer-highly unsaturated rubbery polymer blend which comprises, prior to blending of the polymers, treating or hot-mixing the terpolymer with a chemical promoter and then blending the thus treated terpolymer, preferably upon suitably cooling the same, with the highly unsaturated rubbery polymer.

Also, according to the present invention, there is produced a terpolymer which upon blending with a highly unsaturated rubbery polymer will have in the blend a cure rate which is comparable to that of the highly unsaturated rubbery polymer.

Still according to the invention, a blend of an ethylene/alpha-monoolefin/nonconjugated diene terpolymer-highly unsaturated rubbery polymer is provided, said blend having a desirable cure rate and other properties yielding upon vulcanization a product or final vulcanizate having improved and/or desirable properties.

Representative examples of useful alpha-monoolefins for the preparation of suitable terpolymers have the structure $R - CH = CH_2$, have 3–18 carbon atoms per molecule, wherein R is an alkyl radical having 1–16 carbon atoms and include: propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

The nonconjugated dienes which are included in the terpolymer which is treated according to the invention are those known in the art. These dienes include those which have the structure

wherein $R_1$ is an alkylene radical, $R_2$ and $R_3$ are independently selected from the group consisting of hydrogen and alkyl radicals, and $R_4$ is an alkyl radical and wherein $R_1$ to $R_4$ are so selected that the diene has from about 6–22 carbon atoms; a 5-alkenyl-substituted-2-norbornene; 5-methylene-2-norbornene; and 2-alkyl-2-norbornadienes, and dicyclopentadiene.

Representative examples of these terpolymers are described in U.S. Pat. Nos. 2,933,480 and 3,000,866. Also included are terpolymers of ethylene, at least one alpha-monoolefin as described above and a 5-alkenyl-substituted-2-norbornene or 5-methylene-2-norbornene or a 2-alkyl-2,5-norbornadiene.

The ethylene monomer unit concentration ranges in general from about 20 percent to about 72 percent by weight. Terpolymers having more ethylene monomer units tend to be stiff and non-elastomeric. The concentration of $R - CH = CH_2$ monomer units ranges in general from about 25 percent to about 77 percent by weight. Terpolymers having a higher propylene content are known to be leathery and boardy.

The nonconjugated diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of sulfur curability, the iodine number of the terpolymer should be at least 5. The iodine number is a measure of the total unsaturation of the polymer. Iodine numbers in excess of about 60 are undesirable in that values higher than this are not needed for curability and may indicate the presence of excessive amounts of diene component.

Other norbornenes and ethylene/alpha-monoolefin/-noncojugated diene terpolymers are described in U.S. Pat. No. 3,296,183, and are included as part of the instant disclosure.

Although the terpolymer rubbers which are particularly applicable in the present invention are those known generally in the art (EPDM), the specific rubber employed in the runs made according to the invention in the examples was Nordel (a registered trademark) 1070 described in "A Technical Report on Nordel Hydrocarbon Rubber, a Sulfur-Curable Ethylene-Propylene Elastomer," April, 1964, Elastomer Chemicals Department, E. I. du Pont de Nemours and Company, Inc., the substance of which is incorporated herein by reference. Nordel 1070 is now believed to be a terpolymer of ethylene, propylene, and 1,4-hexadiene.

The publication identified above discloses hot-mixing of Nordel 1070 with chemical promoters in order to improve the state of cure of compounds containing this rubber and mineral fillers.

The unsaturated elastomers which can be blended with the heat treated terpolymers according to this invention can be any of the prior art highly unsaturated rubbery polymers. Suitable examples include natural rubber, polyisoprenes, polybutadienes, styrene/butadiene polymers, butadiene/acrylonitrile copolymers, polypentenamer, and other known rubbery polymers having a high degree of unsaturation. When copolymers of conjugated dienes and vinyl monomers are employed, these will, of course, be elastomeric in the vulcanized state. Also, the conjugated diene content in the resulting polymer preferably will be at least about 50 weight percent based on the copolymer. This will generally assure that the copolymer will be elastomeric in nature upon vulcanization rather than resinous (non-elastomeric).

Promoters which are suitable for use in the hot mixing of terpolymer rubbers according to the invention prior to blending them together with the highly unsaturated elastomer are known in the art for heat processing of butyl rubber containing carbon black. U.S. Pat. No. 2,882,342 discloses and describes dinitroso compounds, dioxime compounds, diimine and related compounds which are applicable to the present invention. Such compounds as are applicable are as follows.

The aromatic dinitroso compounds which can be employed include those which have the general formula: $Ar(NO)_2$ wherein Ar is a 1,4-arylene radical or substitution product thereof. Typical of such compounds are p-dinitroso benzene, p-dinitroso toluene, p-dinitroso xylene, p-dinitroso cymene, 1,4-dinitroso naphthalene, etc. or similar derivatives in which side chains, etc. are introduced on the arylene nucleus for the purpose of conferring modified properties, greater solubilities, etc.

The meta dinitroso aromatic compounds are similarly usable and they are substantially as satisfactory as the para compounds; substantially any para-dinitroso or meta-dinitroso aromatic compound can be used.

Instead of aromatic dinitroso compounds, there can also be used 1,3-aliphatic dinitroso compounds, polynitroso aromatic compounds, and aliphatic dinitroso compounds of the type:

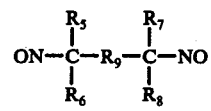

wherein $R_5$, $R_6$, $R_7$ and $R_8$ are radicals other than hydrogen and $R_9$ is a divalent radical.

Certain compounds containing an ortho- or para-quinonoid nucleus of the benzene or naphthalene series or compounds capable of forming an ortho-or para-quinonoid nucleus of the benzene or naphthalene series in the presence of an oxidizing agent can also be used. One such class is the quinone imines, or more particularly, the quinone di-imines. One example of this type of compound is p-quinone dioxime.

This quinonoid substance is defined broadly as containing, or capable of forming on oxidation, an ortho- or p-quinonoid nucleus of the benzene or naphthalene series. When the quinonoid substance contains the quinonoid nucleus directly it is preferably, but not necessarily, used in the presence of an oxidizing agent such as a higher metallic oxide. When the quinonoid substance is merely one capable of forming on oxidation, an ortho- or p-quinonoid nucleus, it necessarily is used in the presence of an oxidizing agent such as a higher metallic oxide, such as lead oxide, and the like.

Thus a preferred treating material of this type is a diimine compound containing the structure:

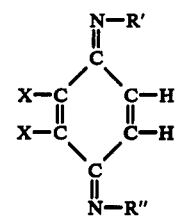

in which R' and R" are any desired substituents alike or different, including hydrogen, hydroxy, the halogen, mercaptan groups, phenyl, alkyl, aryl, aralkyl, cyclic radicals generally, aliphatic radicals generally, metallic salts generally, ethers and thioethers and in fact substantially any substituent radical having a single bond which can be coupled to nitrogen, and X is hydrogen, or a ring structure.

The naptho-quinones have the formula:

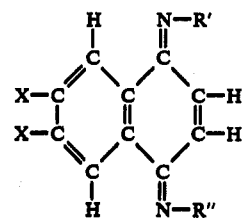

and are similarly usable, R' and R" being a desired substituent as above pointed out.

Various fillers as known in the art such as carbon blacks can be used. When used the filler will preferably be present with the terpolymer during the hot-mix treatment with the chemical promoter.

The ethylene/alpha-monoolefin/nonconjugated diene terpolymer rubber is mixed with the promoter according to this invention under the following conditions. The temperature employed in the hot-mixing step is generally between 240° and 450° F, preferably from 300° to 400° F. The time employed in the hot-mixing step is generally in the range of from 1 minute to 15 minutes and is preferably from 5 to 10 minutes. The mixing is conveniently carried out in conventionally employed rubber processing machinery. Such equipment is well known in the art and provides a mechanical working or shearing action of the rubber containing the promoter. Roll mills and internal mixers such as a Banbury internal mixer can be employed for the mixing operation. It is convenient and preferable to premix the promoter and the terpolymer rubber on a cool roll mill in order to disperse the promoter homogeneously throughout the rubber and thereafter treating this homogeneous mixture under the conditions described above to provide the heat treated terpolymer component of the blends of this invention.

As stated, when the final blend is to contain filler, the filler preferably should be present with the terpolymer during the hot-mixing step. It is further preferred that the same level of filler be in the terpolymer component of the blend as in the unsaturated elastomer component of the blend.

It is also preferred to cool the terpolymer rubber which has been hot mixed according to the above conditions prior to blending this component with the highly unsaturated elastomer component.

The range in the weight ratio of terpolymer to highly unsaturated rubbery polymer according to this invention can be broadly from 5/95 up to 95/5 weight ratio of terpolymer (which has been hot mixed with a promoter according to this invention) to the unsaturated rubber which has been defined above. It is preferred that the weight ratio range be from 15/85 up to 40/60 of terpolymer to highly unsaturated rubbery polymer.

The above polymers can be blended in conventional equipment such as internal mixers or on a roll mill in prior art methods providing that an essentially homogeneous mixture of the two rubbery polymers is obtained.

The blends of this invention can be compounded with fillers, extender oils, curatives such as sulfur, accelerators, and activators which are known in the art for the vulcanization and reinforcement and/or oil extension of conventional rubbery polymers. Fillers such as carbon black, silica, clay and the like can be employed as well as extender oils of the aromatic or naphthenic type. If desired, pigments for obtaining compounded stocks of various colors can be added to the blends of this invention.

EXAMPLE I

Two runs were made which employed the compounding recipe shown below. In these runs the blends of SBR-1502 and EPDM were prepared in the following manner. A masterbatch (MB-1) of SBR-1502 (100 parts by weight), carbon black (50 phr), oil (10 phr), zinc oxide, (5 phr), and stearic acid (1 phr) was prepared by mixing the rubber and other ingredients in an internal mixer (BR-Banbury) for a total mixing time of 4–5 minutes and to dump temperature of 300° F. A second masterbatch (MB-2) was prepared by mixing EPDM (100 parts by weight), carbon black (50 phr), oil(10 phr), zinc oxide (5 phr), and stearic acid (1 phr) under essentially the same conditions as MB-1. A third masterbatch (MB-3) was prepared by mixing the same components in the same amounts as MB-2 but with the addition of a promoter, p-quinone dioxime (1 phr) to the mixture. Furthermore, the temperature of the mixture was allowed to reach 350° F and then was maintained at 350°–400° F for the final five minutes of about ten minutes total mixing time.

| Compounding Recipe | Parts, by wt. |
|---|---|
| EPDM[a] | 30 |
| SBR-1502[b] | 70 |
| Carbon black[c] | 50 |
| Zinc oxide | 5 |
| Stearic acid | 1 |
| Oil[d] | 10 |
| p-Quinone dioxime | variable |
| Curatives: | |
| N-oxydiethylene-2-benzothiazolesulfenamide | 0.85 |
| Diphenylguanidine | 0.4 |
| Sulfur | 1.4 |

[a]A commercially available ethylene/propylene/diene elastomer having a Mooney viscosity (ML-4 at 212° F.) of about 85, an unsaturation (wt. %

of about 1.2 and about 48 wt. % propylene with the diene monomer believed to be 1,4-hexadiene.
[b]ASTM D 1419-61T.
[c]Type N330 under ASTM D 2516-66T.
[d]A commercially available naphthenic liquid plasticizer or softener or extender oil having 47.5% aromatics, a viscosity (100° F.) of 2525 SUS, a flash point of 430° F. and an aniline point of 172° F.

In order to prepare the compounded stocks for curing and subsequent testing, the above described masterbatches were blended on a roll mill at 158° F. as follows: compound Z (control) was prepared from a blend of MB-1 and MB-2 at a 70/30 weight ratio while compound A (invention) was prepared from a 70/30 blend of MB-1 and MB-3. The curvature shown in the compounding recipe were then added to compounds Z and A on a roll mill (remill step) at 158° F. Samples of compounded stocks Z and A were then cured at 307° F. for the times indicated in Table I which also presents the physical properties of the cured compounds.

TABLE I

| Property | Cure time, Min. | Compound Z | Compound A |
|---|---|---|---|
| Tensile, psi[a] | 20 | 1890 | 2080 |
| | 30 | 2260 | 2260 |
| | 45 | 1980 | 2385 |
| Elongation,%[a] | 20 | 435 | 520 |
| | 30 | 435 | 500 |
| | 45 | 385 | 500 |
| Heat build-up (ΔT), ° F[b] | 30 | —[c] | 108 |
| | 45 | —[c] | 102 |
| Resilience, %[d] | 30 | 55 | 60 |
| | 45 | 56 | 60 |

[a]ASTM D 412-66.
[b]ASTM D 623-62.
[c]Sample pellet unrolled (failed) during test.
[d]ASTM D 945-59. Test specimen is a right circular cylinder 0.7 inch in diameter and 1 inch high.

The results in Table I demonstrate that hot mixing the EPDM component of the blend with the promoter (compound A) gave improved physical properties in the vulcanizates compared with the control procedure.

EXAMPLE II

Other runs were made which compared two other controls against the procedure of this invention. These runs employed the same compound recipe as that shown in Example I. However, a different lot of the same EPDM elastomer was employed in these runs since the lot used in Example I was depleted. In order to prepare the compounded stocks for the runs of this example, four masterbatches were prepared as follows: MB-4, using SBR-1502, was prepared in exactly the same manner as MB-1 of Example I; MB-5, using EPDM, was prepared in exactly the same manner as MB-2 of Example I; MB-6, using EPDM, was prepared in exactly the same manner as MB-3 of Example I except that the promoter, p-quinone dioxime, was omitted, and MB-7, using EPDM, was prepared in exactly the same manner as MB-3 of Example I. From the above four masterbatches, three blends were prepared as follows: MB-4 and MB-5, 70/30 weight ratio, with 0.3 phr p-quinone dioxime added in the first mill blending step provided compound X; MB-4 and MB-6, 70/30 weight ratio, provided compound Q, and MB-4 and MB-7, 70/30 weight ratio, provided compound D. The curatives in the recipe were added to the three compounds X, Q and D in a remilling step as was done in Example I. Samples of the compounded stocks were then cured at 307° F. for the times indicated in Table II which also presents the physical properties of the cured compounds.

From the description of the preparation of compounds X, Q and D, one can see that the effect of the promoter, p-quinone dioxime, added to a blend of SBR-1502 and EPDM in the absence of a hot-mixing step will be observed from compound X. Compound Q will show the effect of a hot-mixing step for the EPDM component of the blend but in the absence of the promoter, p-quinone dioxime, while compound D is another run of the invention showing the effect of hot mixing the EPDM with the promoter prior to blending the EPDM with SBR-1502.

Table II

| Property | Cure Time Min. | Compound X | Q | D |
|---|---|---|---|---|
| Tensile, psi | 30 | 1380 | 1930 | 2230 |
|  | 45 | 1700 | 1880 | 2150 |
| Elongation, % | 30 | 270 | 450 | 470 |
|  | 45 | 300 | 420 | 440 |
| Heat build-up (ΔT), °F | 30 | 93 | 103 | 100 |
|  | 45 | 94 | 101 | 96 |

The results in Table II again demonstrate that the compound prepared according to the invention (compound D) gave better vulcanizate properties than either of the control compounds (X and Q).

Reasonable variation and modification are possible within the scope of the foregoing disclosure and the appended claims to the invention, the essence of which is that prior to blending a terpolymer rubber as herein disclosed with a highly unsaturated elastomer, the terpolymer is hot-mixed with a chemical promoter to alter its rate of cure so that the components of a rubbery blend later prepared by blending the hot-mix treated terpolymer and the highly unsaturated elastomer will cure at more nearly or essentially the same rate, thus providing compounded stocks of significantly improved physical properties over blends in which the terpolymer component has not been treated according to the invention. As used herein and in the claims EPDM is intended to define a terpolymer as in the ASTM designation previously quoted.

I claim:

1. A process for producing an improved sulfur curable ethylene/alpha-monoolefin/nonconjugated diene terpolymer-highly unsaturated rubbery polymer blend which comprises, before bringing together the components of the blend, treating the ethylene/alpha-monoolefin/nonconjugated diene terpolymer with a chemical promoter which is p-quinone dioxime at an elevated temperature to alter its cure rate, said promoter and temperature being effective to impart to the terpolymer a cure rate which is comparable to that of the highly unsaturated rubber polymer in the blend, and then blending the thus modified ethylene/alpha-monoolefin/nonconjugated diene terpolymer with said unsaturated rubbery polymer.

* * * * *